(12) United States Patent
Anisimovich et al.

(10) Patent No.: US 11,087,093 B2
(45) Date of Patent: *Aug. 10, 2021

(54) USING AUTOENCODERS FOR TRAINING NATURAL LANGUAGE TEXT CLASSIFIERS

(71) Applicant: ABBYY Production LLC, Moscow (RU)

(72) Inventors: Konstantin Vladimirovich Anisimovich, Moscow (RU); Evgenii Mikhailovich Indenbom, Moscow (RU); Ivan Ivanovich Ivashnev, Smolensk (RU)

(73) Assignee: ABBYY Production LLC, Moscow (RU)

(*) Notice: Subject to any disclaimer, the term of this patent is extended or adjusted under 35 U.S.C. 154(b) by 46 days.

This patent is subject to a terminal disclaimer.

(21) Appl. No.: 16/599,685

(22) Filed: Oct. 11, 2019

(65) Prior Publication Data

US 2020/0042600 A1 Feb. 6, 2020

Related U.S. Application Data

(63) Continuation of application No. 15/852,418, filed on Dec. 22, 2017, now Pat. No. 10,474,756.

(30) Foreign Application Priority Data

Dec. 11, 2017 (RU) .......................... RU2017143146

(51) Int. Cl.
*G06F 40/30* (2020.01)
*G06K 9/62* (2006.01)
(Continued)

(52) U.S. Cl.
CPC .......... *G06F 40/30* (2020.01); *G06K 9/6267* (2013.01); *G06N 3/0454* (2013.01); *G06N 3/084* (2013.01); *G06N 3/088* (2013.01); *G06N 3/0481* (2013.01)

(58) Field of Classification Search
CPC ......... G06F 40/30; G06K 9/6267; G06N 3/08
See application file for complete search history.

(56) References Cited

U.S. PATENT DOCUMENTS 6,192,360 B1 * 2/2001 Dumais ................ G06K 9/6269
6,507,829 B1 1/2003 Richards et al.
(Continued)

OTHER PUBLICATIONS

Xu, Weidi, et al. "Variational autoencoder for semi-supervised text classification." Proceedings of the AAAI Conference on Artificial Intelligence. vol. 31. No. 1. 2017. (Year: 2017).*
(Continued)

*Primary Examiner* — Shaun Roberts
(74) *Attorney, Agent, or Firm* — Lowenstein Sandler LLP

(57) ABSTRACT

Systems and methods for using autoencoders for training natural language classifiers. An example method comprises: producing, by a computer system, a plurality of feature vectors, wherein each feature vector represents a natural language text of a text corpus, wherein the text corpus comprises a first plurality of annotated natural language texts and a second plurality of un-annotated natural language texts; training, using the plurality of feature vectors, an autoencoder represented by an artificial neural network; producing, by the autoencoder, an output of the hidden layer, by processing a training data set comprising the first plurality of annotated natural language texts; and training, using the training data set, a text classifier that accepts an input vector comprising the output of the hidden layer and yields a degree of association, with a certain text category, of a (Continued)

natural language text utilized to produce the output of the hidden layer.

20 Claims, 9 Drawing Sheets

(51) Int. Cl.
*G06N 3/08* (2006.01)
*G06N 3/04* (2006.01)

(56) References Cited

U.S. PATENT DOCUMENTS

| | | | |
|---|---|---|---|
| 8,886,579 B2 | 11/2014 | De Sousa Webber | |
| 9,852,215 B1 | 12/2017 | Sullivan et al. | |
| 2006/0074908 A1* | 4/2006 | Selvaraj | G06K 9/6269 |
| 2012/0078834 A1* | 3/2012 | Sainath | G06F 40/216 |
| | | | 706/50 |
| 2012/0159620 A1 | 6/2012 | Seifert et al. | |
| 2014/0279738 A1 | 9/2014 | Mahler et al. | |
| 2015/0066496 A1 | 3/2015 | Deoras et al. | |
| 2015/0347489 A1* | 12/2015 | Sherwin | G06Q 50/184 |
| | | | 707/722 |
| 2015/0363688 A1 | 12/2015 | Gao et al. | |
| 2017/0061330 A1* | 3/2017 | Kurata | G06N 3/084 |
| 2017/0147906 A1 | 5/2017 | Shekhar et al. | |
| 2017/0161633 A1 | 6/2017 | Clinchant et al. | |
| 2017/0220897 A1 | 8/2017 | Chidlovskii et al. | |
| 2018/0165554 A1 | 6/2018 | Zhang et al. | |
| 2018/0330729 A1 | 11/2018 | Golipour et al. | |
| 2018/0357608 A1 | 12/2018 | Agrawal et al. | |
| 2019/0138599 A1 | 5/2019 | Sen et al. | |

OTHER PUBLICATIONS

Joulin, Armand, et al., "Bag of tricks for Efficient Text Classification", Jul. 7, 2016, 5 pages.
Chandar, Sarath A P, "An Autoencoder Approach to Learning Bilingual Word Representations", Feb. 6, 2014.
De Boom, Cedric et al., "Representation learning for very short texts using weighted word embedding aggregation", Jul. 2, 2016, 8 pages.
Oshri, Barak and Khandwala, Nishith, "There and Back Again: Autoencoder for Textual Reconstructions", 2015, 9 pages.
USPTO, Notice of Allowance for U.S. Appl. No. 15/852,418 (L0172), dated Jul. 10, 2019.

\* cited by examiner

USING AUTOENCODERS FOR TRAINING NATURAL LANGUAGE TEXT CLASSIFIERS

REFERENCE TO RELATED APPLICATIONS

This application is a continuation of U.S. patent application Ser. No. 15/852,418, filed Dec. 22, 2017, which claims the benefit of priority under 35 U.S.C. § 119 to Russian Patent Application No. 2017143146 filed Dec. 11, 2017. Both above-referenced applications in their respective entireties are incorporated by reference herein.

TECHNICAL FIELD

The present disclosure is generally related to computer systems, and is more specifically related to systems and methods for natural language processing.

BACKGROUND

Various natural language processing tasks may involve classifying natural language texts. Examples of such tasks include detecting semantic similarities, search result ranking, determination of text authorship, spam filtering, selecting texts for contextual advertising, etc.

SUMMARY OF THE DISCLOSURE

In accordance with one or more aspects of the present disclosure, an example method of using an autoencoder for training a natural language classifier may include: producing, by a computer system, a plurality of feature vectors, wherein each feature vector represents a natural language text of a text corpus, wherein the text corpus comprises a first plurality of annotated natural language texts and a second plurality of un-annotated natural language texts; training, using the plurality of feature vectors, an autoencoder represented by an artificial neural network; producing, by the autoencoder, an output of the hidden layer, by processing a training data set comprising the first plurality of annotated natural language texts; and training, using the training data set, a text classifier that accepts an input vector comprising the output of the hidden layer and yields a degree of association, with a certain text category, of a natural language text utilized to produce the output of the hidden layer.

In accordance with one or more aspects of the present disclosure, an example system of classifying a natural language text may include a memory and a processor, coupled to the memory, the processor configured for: receiving, by a computer system, a natural language text; processing the natural language text by an autoencoder represented by an artificial neural network; feeding, to a text classifier, an input vector comprising an output of the hidden layer; and determining, using the text classifier, a degree of association of the natural language text with a certain text category.

In accordance with one or more aspects of the present disclosure, an example computer-readable non-transitory storage medium may comprise executable instructions that, when executed by a computer system, cause the computer system to: produce a plurality of feature vectors, wherein each feature vector represents a natural language text of a text corpus, wherein the text corpus comprises a first plurality of annotated natural language texts and a second plurality of un-annotated natural language texts; train, using the plurality of feature vectors, an autoencoder represented by an artificial neural network; produce, by the autoencoder, an output of the hidden layer, by processing a training data set comprising the first plurality of annotated natural language texts; and train, using the training data set, a text classifier that accepts an input vector comprising the output of the hidden layer and yields a degree of association, with a certain text category, of a natural language text utilized to produce the output of the hidden layer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
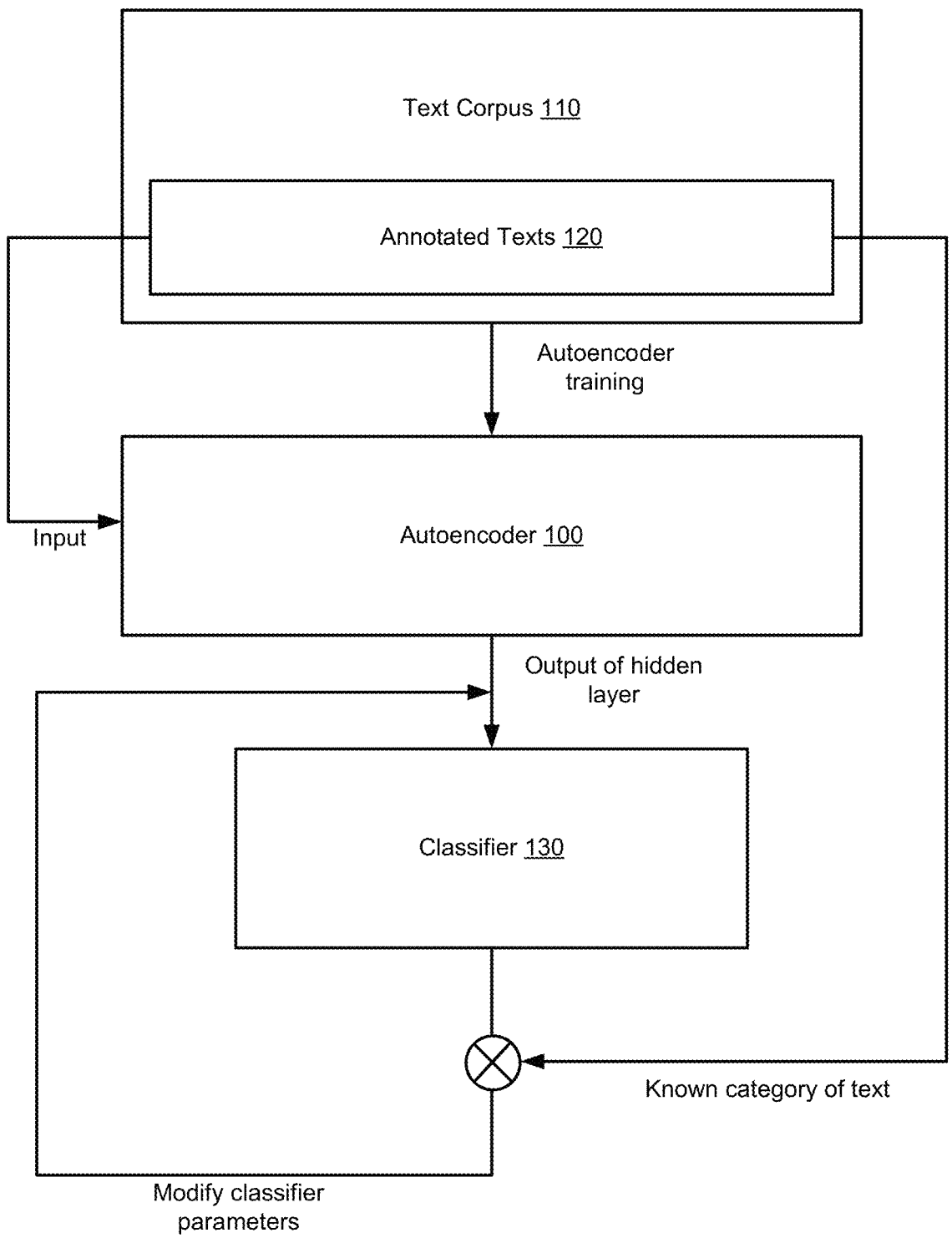
FIG. 1 schematically illustrates an example workflow employing an autoencoder for training a natural language text classifier, in accordance with one or more aspects of the present disclosure.

Described herein are methods and systems for using autoencoders for training natural language classifiers. Natural language text classification may involve associating a given natural language text, which may be represented, e.g., by at least a portion of a document, with one or more categories of a certain set of categories. In certain implementations, the set of categories may be pre-determined (e.g., "spam" and "legitimate messages" for classification of electronic mail messages). Alternatively, the set of categories may be identified on-the-fly at the time of performing the classification, by analyzing a corpus of natural language texts, or documents (e.g., multiple items of a newsfeed).

"Computer system" herein shall refer to a data processing device having a general purpose processor, a memory, and at least one communication interface. Examples of computer systems that may employ the methods described herein include, without limitation, desktop computers, notebook computers, tablet computers, and smart phones.

In automated text classification, each natural language text may be represented by a point within a multi-dimensional space of the chosen text features, where the point coordinates are represented by the feature values. Therefore, performing the text classification may involve determining parameters of one or more separating hyper-planes that split the multi-dimensional space into sectors representing the classification categories.

Text classification may be performed by evaluating a classification function, also referred to as classifier, which may be represented by a function of a plurality of text features that yields the degree of association of the text being classified with a certain category of the plurality of classification categories (e.g., the probability of the text being associated with a certain category). The text classification may involve evaluating a chosen classification function for each category of the plurality of classification categories, and associating the natural language text with the category corresponding to the optimal (maximum or minimum) value of the classification function.

In certain implementations, each natural language text may be represented by a feature vector including a plurality of numerical values reflecting the respective text features. In an illustrative example, each element of the vector may store a value reflecting certain frequency characteristics of a word identified by the index of the element, as described in more detail herein below.

Values of one or more parameters of the classifier may be determined by a supervised learning method, which may involve iteratively modifying the parameter values based on analyzing a training data set including natural language texts with known classification categories, in order to optimize a fitness function reflecting the ratio of the number of natural language texts of a validation data set that would be classified correctly using the specified values of the classifier parameters to the total number of the natural language texts in the validation data set.

In practice, the number of available annotated texts which may be included into the training or validation data set may be relatively small, as producing such annotated texts may involve receiving the user input specifying the classification category for each text. Supervised learning based on relatively small training and validation data sets may produce poorly performing classifiers.

The present disclosure addresses the above-noted and other deficiencies of known text classification methods by utilizing autoencoders for extracting information from large, mostly un-annotated, text corpuses, such that the extracted information may then be leveraged in the classifier training process. "Autoencoder" herein shall refer to an artificial neural network employed for unsupervised learning of encodings of sets of data, typically for the purpose of dimensionality reduction. An autoencoder may be implemented by a three-layer artificial neural network, in which the dimensions of the input and output vectors are equal, while the dimension of the hidden intermediate layer is significantly less than that of the input and output layers, as described in more detail herein below. Unsupervised learning of an autoencoder involves processing a sample data set in order to determine the values of one or more autoencoder parameters, in order to minimize the output error reflecting the difference between the input and output vectors. As the dimension of the hidden layer is significantly less than that of the input and output layers, the autoencoder compresses the input vector by the input layer and then restores is by the output layer, thus detecting certain inherent or hidden features of the input data set.

FIG. 1 schematically illustrates an example workflow employing an autoencoder for training a natural language text classifier, in accordance with one or more aspects of the present disclosure. As shown in FIG. 1, an auto-encoder 100 that has been trained on a corpus of natural language texts 110 may be employed to process the training data set represented by an annotated subset 120 of the text corpus 110. Since the autoencoder 100 has been trained on the whole corpus 110, the output of the hidden layer of the autoencoder 100 processing an annotated text from the training data set 120 would presumably reflect not only the text features extracted from an annotated text, but also the information that has been gleaned by the autoencoder 100 from the whole text corpus 110 during the autoencoder training. Therefore, a classifier 130 processing the output of the hidden layer of the autoencoder 100 would produce more accurate results than a classifier directly processing the text features extracted from the text. The classifier 130 operating on the output of the hidden layer of the autoencoder 100 may be trained using the annotated texts comprised by the training data set 120. The un-annotated texts of the text corpus 110 and/or other similar texts may then be classified by a two-stage process which involves employing the autoencoder to produce the output of the hidden layer and then feeding that output as the input to the trained classifier, as described in more detail herein below.

Various aspects of the above referenced methods and systems are described in details herein below by way of examples, rather than by way of limitation.

Figure 2:
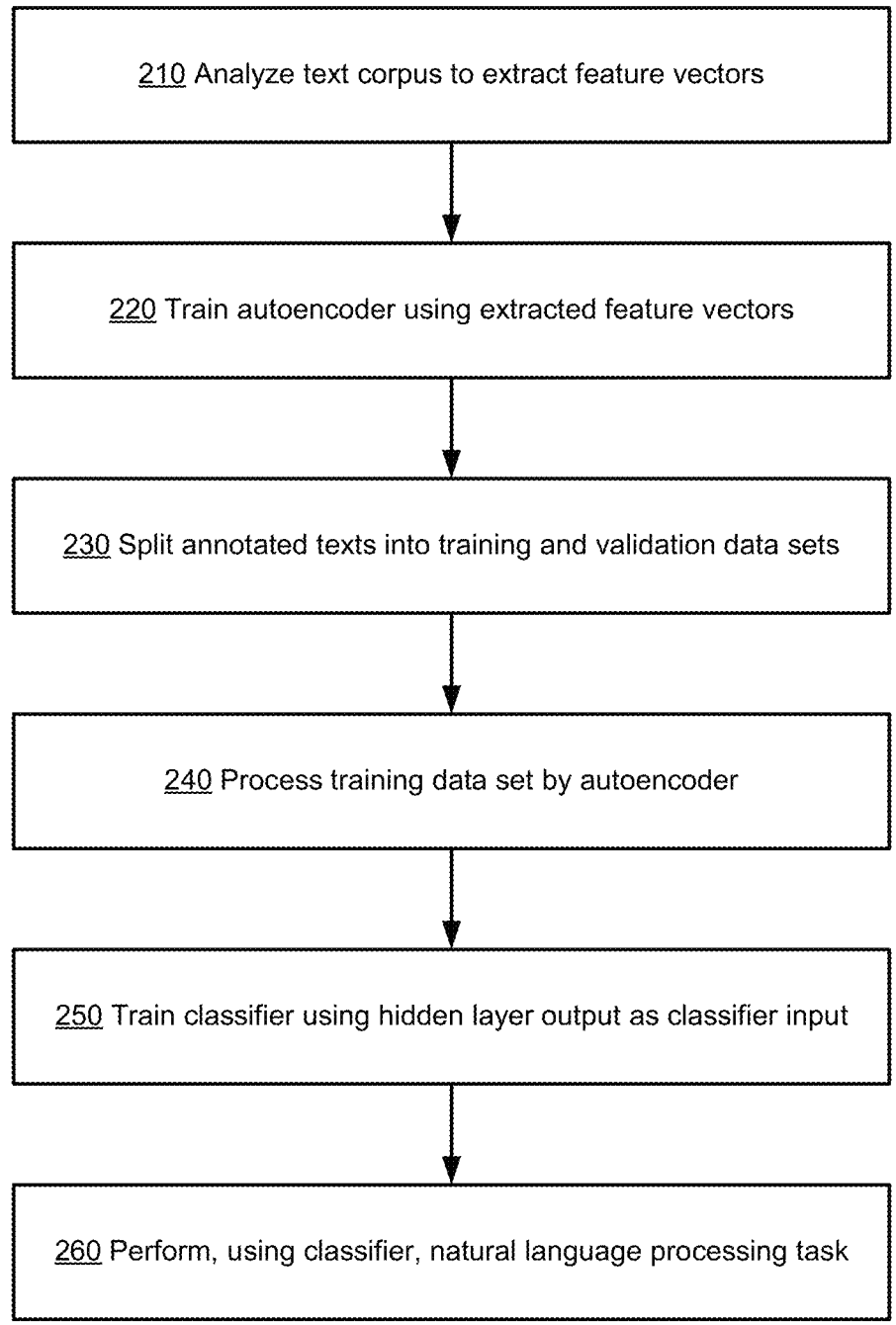
FIG. 2 depicts a flow diagram of one illustrative example of a method of using an autoencoder for training a natural language text classifier, in accordance with one or more aspects of the present disclosure.

FIG. 2 depicts a flow diagram of one illustrative example of a method of using an autoencoder for training a natural language text classifier, in accordance with one or more aspects of the present disclosure. Method 200 and/or each of its individual functions, routines, subroutines, or operations may be performed by one or more processors of the computer system (e.g., computer system 1000 of FIG. 9) implementing the method. In certain implementations, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a computer system implementing the method may analyze a corpus of natural language texts to produce, for each natural language text, a feature vector representing the respective text. The corpus may comprise texts having a common or similar structure (e.g., news articles or electronic mail messages) and representing several classification categories (e.g., literary works by various persons, spam and legitimate electronic mail messages, news articles on foreign policy, science, and sports, etc.). A relatively small subset of text corpus may be annotated, i.e., may include texts having a known classification category (such as authorship of a literary work, spam classification of an electronic mail message, topic of a news article, etc.). It should be noted that methods and systems of the present disclosunammes are well-suited for processing unbalanced training sets, i.e., the training sets in which the number of texts associated with one classification category may be substantially different from the number of texts associated with another classification category.

The feature vectors representing the respective corpus texts may be combined into a matrix representing the text corpus, such that each row of the matrix represents a vector of features of a text identified by the row index, and each column of the matrix represents a certain text feature, e.g., an occurrence of a word identified by the column index.

In an illustrative example, each text may be represented by a "bag of words," i.e., an unordered or arbitrarily ordered set of words contained by the text. Therefore, each matrix cell may store an integer value reflecting the number of occurrences, in the document identified by the row, of the word associated with the column.

In order to reduce the level of noise which may be caused by certain frequently occurring words which do not determine the document category (e.g., articles, prepositions, auxiliary verbs, etc.), each natural language text may be represented by a vector of term frequency—inverse document frequency (TF-IDF) values.

Term frequency (TF) represents the frequency of occurrence of a given word in the document:

$$tf(t,d)=n_t/\Sigma n_k$$

where t is the word identifier,
d is the document identifier,
$n_t$ is the number of occurrences of the word t within document d, and
$\Sigma n_k$ is the total number of words within document d.

Inverse document frequency (IDF) is defined as the logarithmic ratio of the number of texts in the corpus to the number of documents containing the given word:

$$idf(t, D)=\log[|D|/\{di \in D | t \in di\}/]$$

where D is the text corpus identifier,
|D| is the number of documents in the corpus, and
$\{di \in D | t \in di\}$ is the number of documents of the corpus D which contain the word t.

Thus, TF-IDF may be defined as the product the product of the term frequency (TF) and the inverse document frequency (IDF):

$$tf\text{-}idf(t, d, D)=tf(t, d)*idf(t, D)$$

TF-IDF would produce larger values for words that are more frequently occurring in one document that on other documents of the corpus. Accordingly, the text corpus may be represented by a matrix, each cell of which stores the TF-IDF value of the word identified by the column index in the document identified by the row index.

In various alternative implementations, other types of features which may be extracted from natural language texts, including morphological, syntactical, and/or semantic features, may be utilized for text classification by the systems and methods of the present disclosure, in addition to, or instead of the above-described TF-IDF values.

At block 220, the computer system may utilize the feature vectors representing the natural language texts to perform unsupervised learning of an autoencoder, which will then be employed for producing the classifier input. In an illustrative example, the autoencoder may be represented by a three-layer artificial neural network.

A neural network is a computational model based on a multi-staged algorithm that applies a set of pre-defined functional transformations to a plurality of inputs (e.g., a feature vector representing a document) and then utilizes the transformed data for information extraction, pattern recognition, etc. In an illustrative example, a neural network may include multiple artificial neurons, which receive input, change their internal state according to that input and an activation function, and produce output depending on the input and the activated internal state. A neural network may be formed by connecting the output of certain neurons to the input of other neurons to form a directed weighted graph, in which the neurons represent the nodes and the connection between the neurons represent weighted directed edges. The weights and the activation function parameters can be modified by a learning process.

Figure 3:
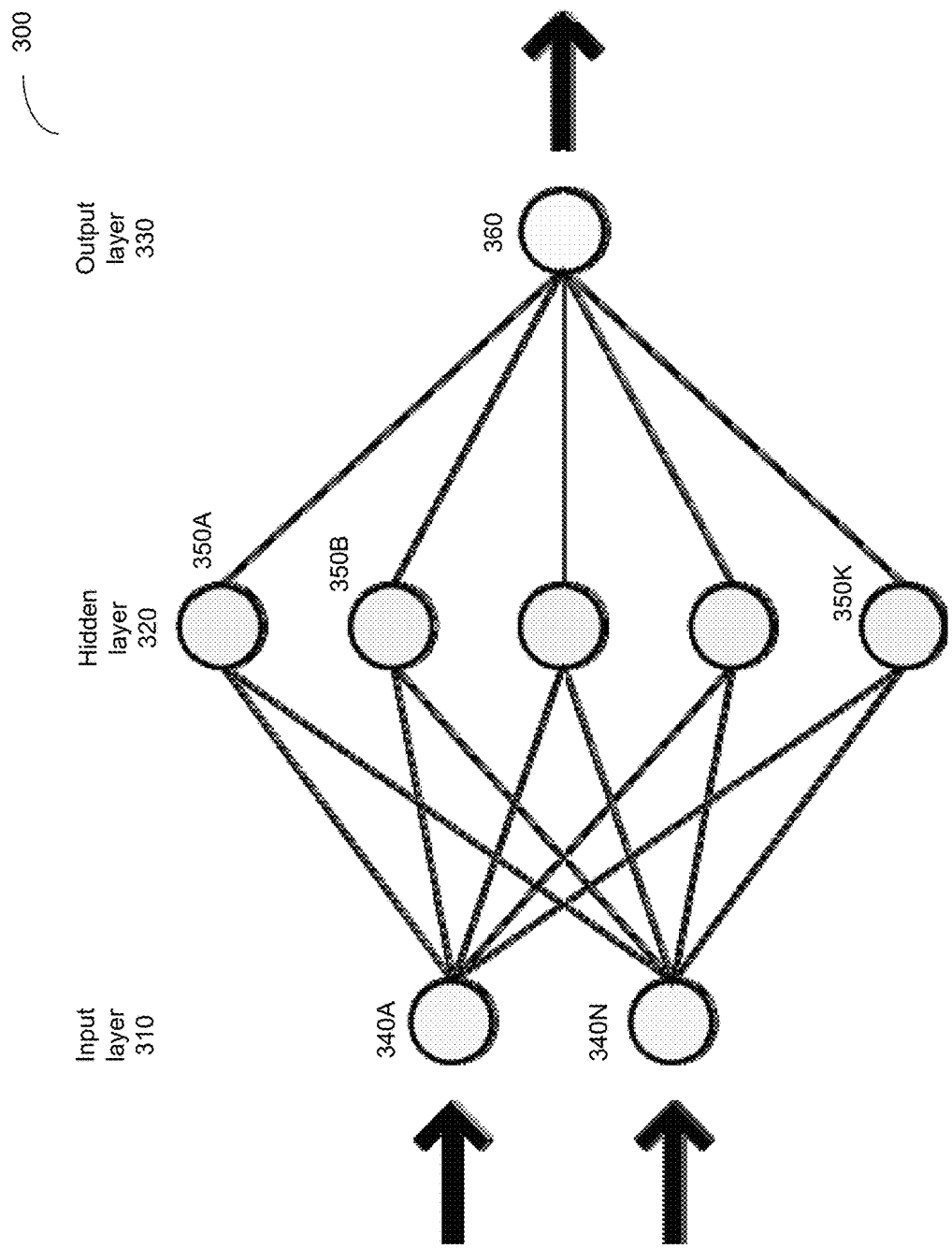
FIG. 3 schematically illustrates a structure of an example neural network operating in accordance with one or more aspects of the present disclosure.

FIG. 3 schematically illustrates a structure of an example neural network operating in accordance with one or more aspects of the present disclosure. As shown in FIG. 3, the neural network 300 may include the input layer 310, the hidden layer 320, and the output layer 330. The input layer 310 may include one or more neurons 340A-340N, which may be connected to one or more neurons 350A-350K of the hidden layer 320. The hidden layer neurons 350A-350K may, in turn, be connected to one or more neurons 360 of the output layer 330.

As noted herein above, a three-layer artificial neural network, in which the dimensions of the input and output vectors are equal, while the dimension of the hidden intermediate layer is significantly less than that of the input and output layers, may implement an autoencoder, which may be employed for unsupervised learning of encodings of sets of data, typically for the purpose of dimensionality reduction.

Figure 4:
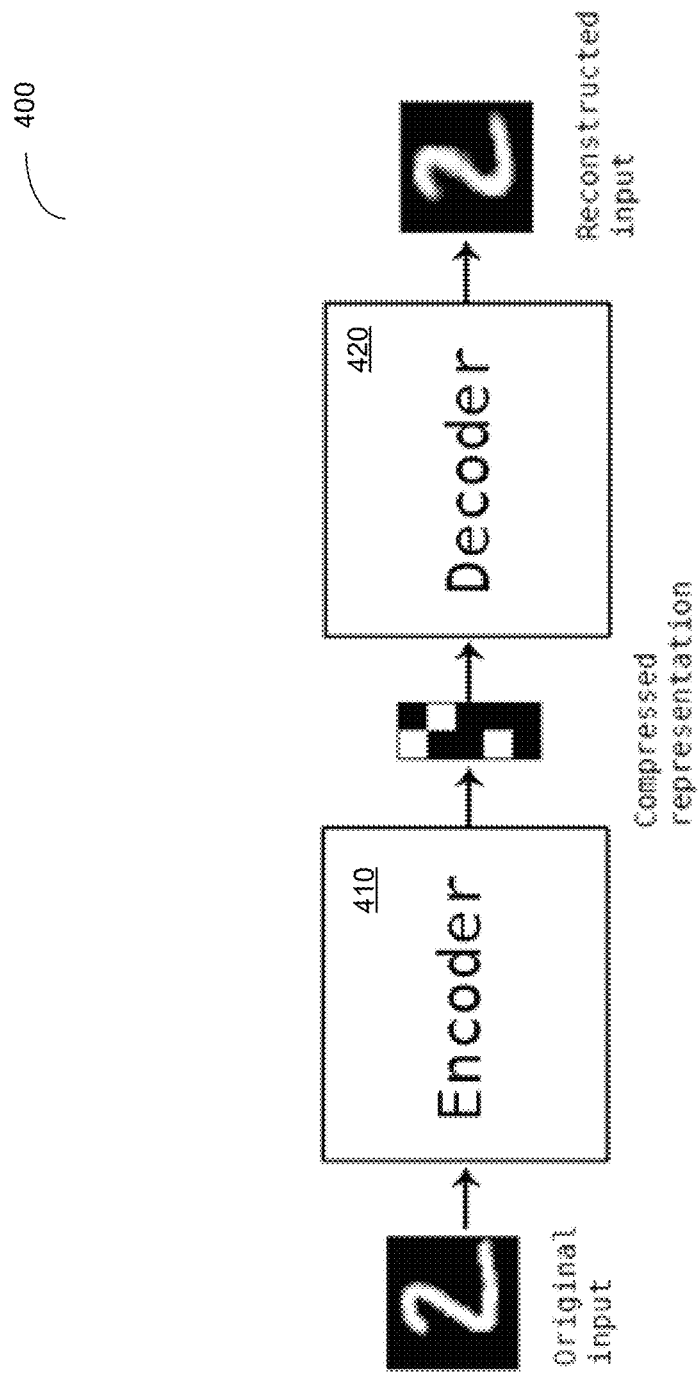
FIG. 4 schematically illustrates operation of an example autoencoder, in accordance with one or more aspects of the present disclosure.

FIG. 4 schematically illustrates operation of an example autoencoder, in accordance with one or more aspects of the present disclosure. As shown in FIG. 4, the example autoencoder 400 may include an encoder stage 410 and a decoder stage 420. The encoder stage 410 of the autoencoder may receive the input vector x and map it to the latent representation z, the dimension of which is significantly less than that of the input vector:

$$z=\sigma(Wx+b),$$

where $\sigma$ is the activation function, which may be represented by a sigmoid function or by a rectifier linear unit,
W is the weight matrix, and
b is the bias vector.

The decoder stage 420 of the autoencoder may map the latent representation z to the reconstruction vector x' having the same dimension as the input vector x:

$$x'=\sigma'(W'z+b').$$

The autoencoder may be trained to minimize the reconstruction error:

$$L(x, x')=\|x-x'\|^2=\|x-\sigma'(\sigma(Wx+b))+b')\|^2,$$

where x may be averaged over the training data set.

As the dimension of the hidden layer is significantly less than that of the input and output layers, the autoencoder compresses the input vector by the input layer and then restores is by the output layer, thus detecting certain inherent or hidden features of the input data set.

Figure 5:
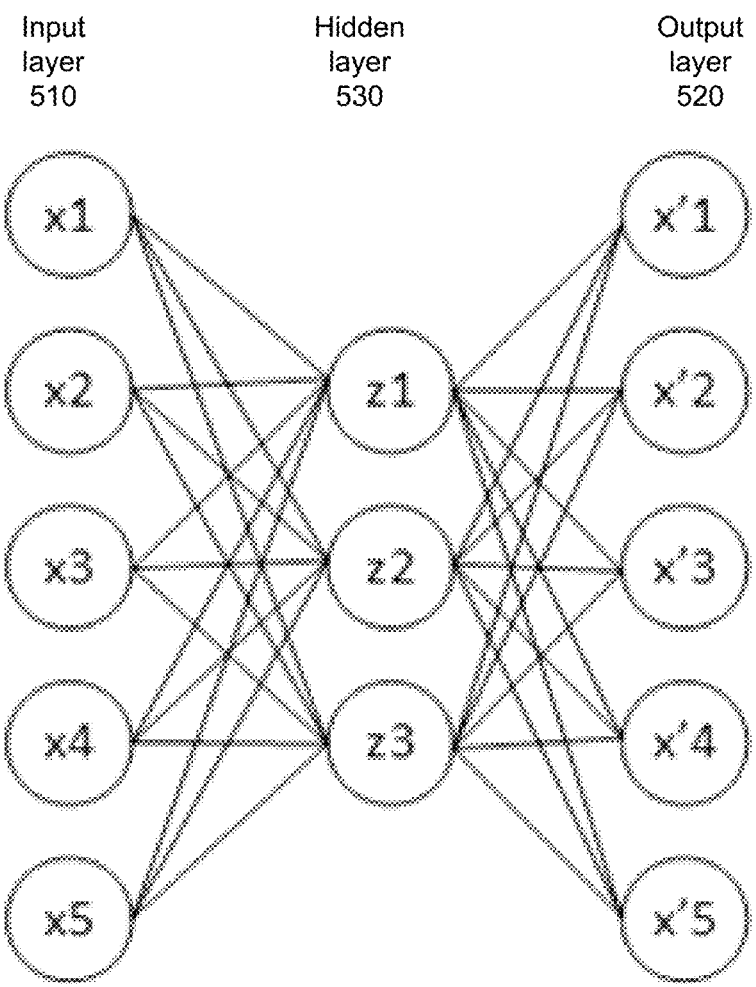
FIG. 5 schematically illustrates a structure of an autoencoder operating in accordance with one or more aspects of the present disclosure.

FIG. 5 schematically illustrates a structure of an example autoencoder operating in accordance with one or more aspects of the present disclosure. As shown in FIG. 5, the autoencoder 500 may be represented by a feed-forward, non-recurrent neural network including an input layer 510, an output layer 520 and one or more hidden layers 530 connecting the input layer 510 and the output layer 520. The output layer 520 may have the same number of nodes as the input layer 510, such that the network 500 may be trained, by an unsupervised learning process, to reconstruct its own inputs.

In certain implementations, the activation function of the hidden layer of the autoencoder may be represented by a rectified linear unit (ReLU), which may be described by the following formula:

$$\sigma(x)=\max(0, x).$$

In certain implementations, the activation function of the output layer of the autoencoder may be represented by a rectified linear unit (ReLU), which may be described by the following formula:

$$\sigma(x)=1/(1+e^{-x}).$$

Unsupervised learning of the autoencoder may involve, for each input vector x, performing a feed-forward pass to obtain the output x', measuring the output error reflected by the loss function L(x, x'), and back-propagating the output error through the network to update the dimension of the hidden layer, the weights, and/or activation function parameters. In an illustrative example, the loss function may be represented by the binary cross-entropy function. The training process may be repeated until the output error is below a predetermined threshold.

Referring again to FIG. 2, at block 230, the computer system may split the annotated subset of the text corpus into the training data set and validation data set. In certain implementations, a k-fold cross-validation method may be applied to the corpus of natural language texts. The method may involve randomly partitioning the annotated texts into k equal sized subsets, one of which is then utilized as the validation data set, and the remaining k−1 compose the training data set. The cross-validation process may then be repeated k times, so that each of the k subsets would once be used as the validation data set.

At block 240, the computer system may utilize the trained autoencoder to process the identified training data set in order to produce the output of the autoencoder's hidden layer. Since the autoencoder has been trained on the whole corpus of texts including both un-annotated and annotated texts, the output of the hidden layer of the autoencoder processing an annotated text from the training data set would presumably reflect not only the input text features of the particular annotated text, but also the information that has been gleaned by the autoencoder from the whole text corpus during the autoencoder training.

At block 250, the computer system may train the classifier utilizing the output produced by the hidden layer of the autoencoder as the input of the classifier. In certain implementations, the classifier may be represented by a linear Support Vector Classification (LinearSVC) classifier. Training the classifier may involve iteratively identify the values of certain parameters of the text classifier model that would optimize a chosen fitness function. In an illustrative example, the fitness function may reflect the number of natural language texts of the validation data set that would be classified correctly using the specified values of the classifier parameters. In certain implementations, the fitness function may be represented by the F-score, which is defined as the weighted harmonic mean of the precision and recall of the test:

$$F=2*P*R/(P+R),$$

where P is the number of correct positive results divided by the number of all positive results, and R is the number of correct positive results divided by the number of positive results that should have been returned.

At block 260, the computer system may utilize the trained classifier to perform a natural language processing task. Examples natural language processing tasks include detecting semantic similarities, search result ranking, determination of text authorship, spam filtering, selecting texts for contextual advertising, etc. Upon completing the operations of block 260, the method may terminate.

In an illustrative example, the trained classifier may be employed for classifying the un-annotated texts of the text corpus 110 and/or other similar texts. The classification process may involve employing the autoencoder to produce the output of the hidden layer, and then feeding that output to the trained classifier. The text classification may involve evaluating a chosen classification function for each category of the plurality of classification categories, and associating the natural language text with the category corresponding to the optimal (maximum or minimum) value of the classification function, as described in more detail herein above, as described in more detail herein below with references to FIG. 7.

Figure 6:
FIG. 6 schematically illustrates the output of the hidden layer of the autoencoder processing an example data set, in accordance with one or more aspects of the present disclosure.

For relatively small training data sets, classifiers trained on the autoencoder output may provide better accuracy than classifiers directly processing the features extracted from an annotated text. FIG. 6 schematically illustrates the output of the hidden layer of the autoencoder processing an example data set. Each plotted shape represents a natural language text, such that the texts classified to the same category are represented by shapes of the same type. As shown by FIG. 6, the output of the hidden layer of the autoencoder exhibits readily perceivable clusterization even after having been transformed, by reducing the number of independent coordinates from the number equal to the dimension of the hidden layer of the autoencoder to two independent coordinates, for performing the two-dimensional visualization.

In practice, a text corpus may initially include only a small subset of annotated documents, but their number may increase with new documents being received, classified, and their classification validated (e.g., by soliciting and receiving a user interface input confirming or modifying the document category produced by a text classifier). Thus, in certain implementations, for certain text corpuses, the output of the hidden layer may be concatenated with the feature vector extracted from the natural language text, and the resulting concatenated vector may be fed to the classifier input for training the classifier.

Figure 7:
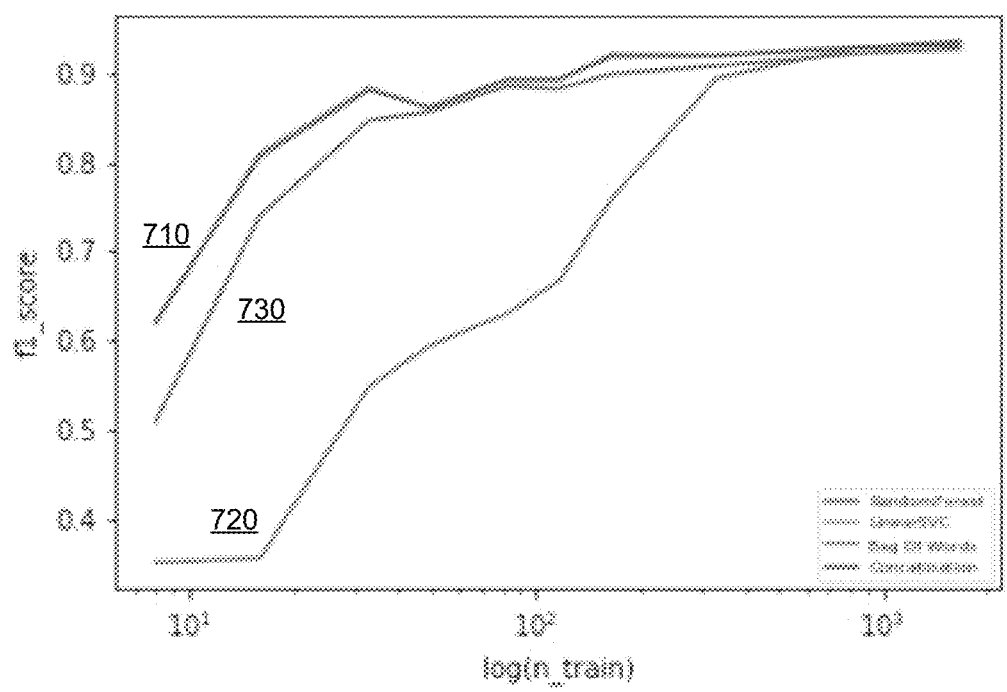
FIG. 7 schematically illustrates the accuracy of text classification by text classifiers processing concatenated input vectors including the text features and the autoencoder output, in accordance with one or more aspects of the present disclosure and text classifiers only processing bags of words.

FIG. 7 schematically illustrates the accuracy of text classification by text classifiers processing concatenated input vectors including the text features and the autoencoder output and text classifiers only processing bags of words. As shown in FIG. 7, the accuracy of the example text classifier 710 which processes concatenated input vectors including the text features and the autoencoder output exceeds, on smaller sizes of training data sets, both the accuracy of a linear classifier 720 only processing bags of words and the accuracy of a random forest classifier 730.

Figure 8:
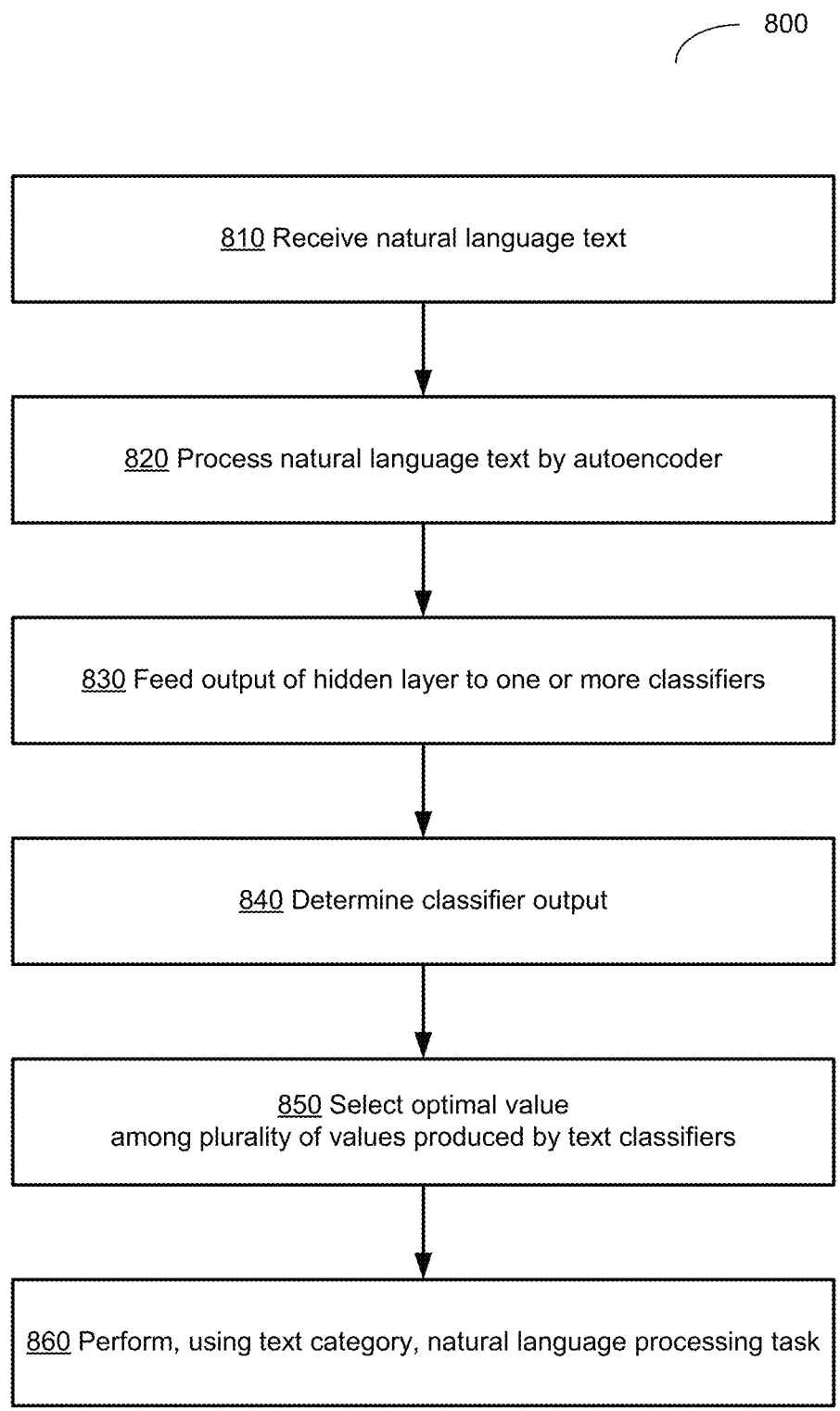
FIG. 8 depicts a flow diagram of one illustrative example of a method for classifying a natural language text, in accordance with one or more aspects of the present disclosure.

FIG. 8 depicts a flow diagram of one illustrative example of a method for classifying a natural language text, in accordance with one or more aspects of the present disclosure. Method 800 and/or each of its individual functions, routines, subroutines, or operations may be performed by one or more processors of the computer system (e.g., computer system 1000 of FIG. 9) implementing the method. In certain implementations, method 800 may be performed by a single processing thread. Alternatively, method 800 may be performed by two or more processing threads, each thread implementing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

At block 810, a computer system implementing the method may receive a natural language text to be classified by associating with a category of a pre-determined set of categories.

At block 820, the computer system may employ an autoencoder, which has been pre-trained on a large text corpus, to process the received natural language text and produce the output of the autoencoder's hidden layer, as described in more detail herein above.

At block 830, the computer system may feed the output of the hidden layer of the autoencoder to one or more classifiers, which has been pre-trained on an annotated subset of the text corpus, as described in more detail herein above.

At block 840, each classifier may produce the degree of association of the text being classified with a respective category of the plurality of classification categories, as described in more detail herein above.

At block 850, the computer system may select the optimal (e.g., maximal or minimal) value among the values produced by the classifiers, and associate the natural language text with the category corresponding to the classifier that has produced the selected optimal value.

At block 860, the computer system may utilize the identified text category to perform a natural language processing task. Examples natural language processing tasks include detecting semantic similarities, search result ranking, determination of text authorship, spam filtering, selecting texts for contextual advertising, etc. Upon completing the operations of block 280, the method may terminate.

Figure 9:
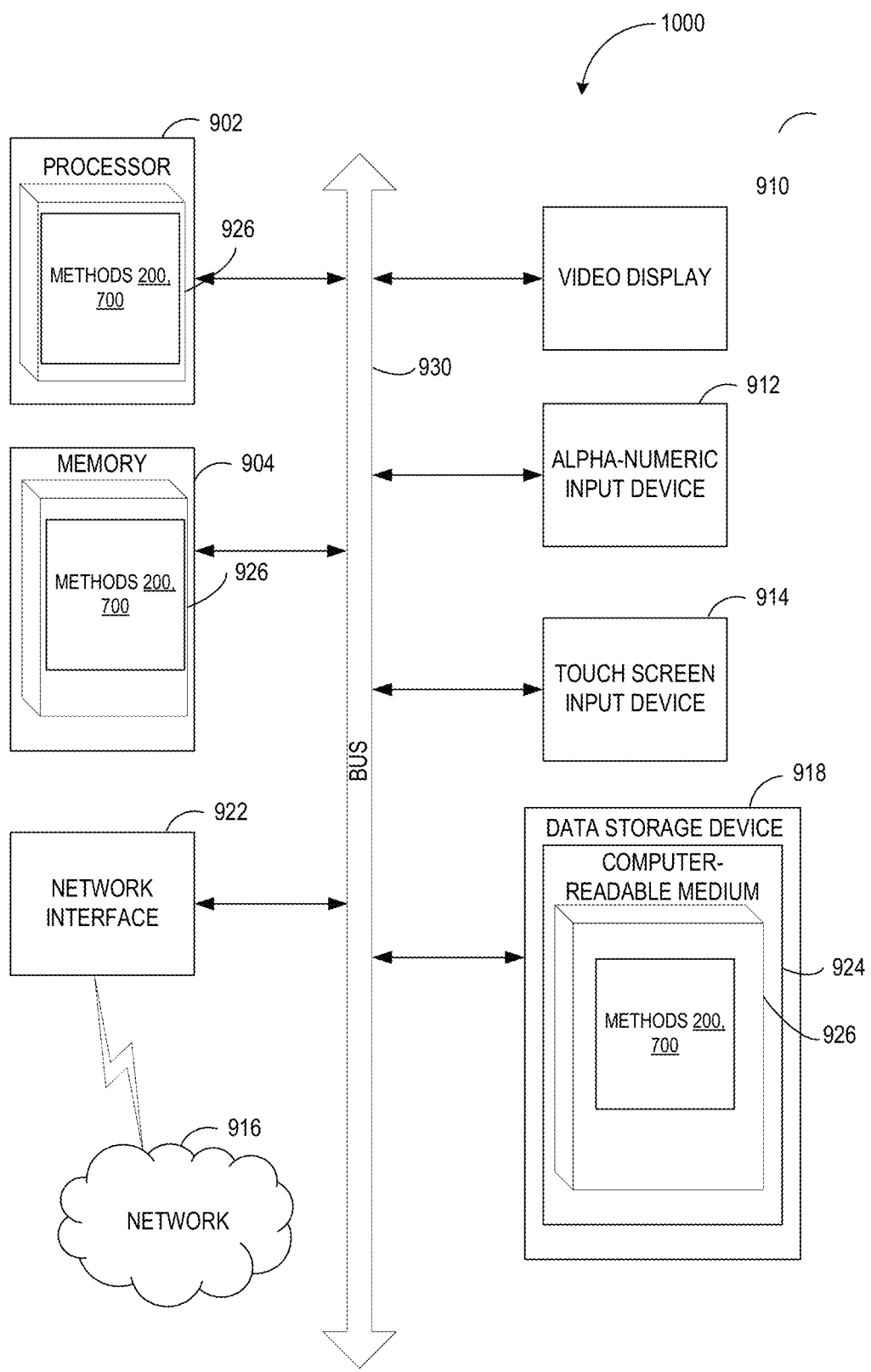
FIG. 9 depicts a diagram of an example computer system implementing the methods described herein.

FIG. 9 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 902, a main memory 904 (e.g., read-only memory (ROM) or dynamic random access memory (DRAM)), and a data storage device 918, which communicate with each other via a bus 930.

Processor 902 may be represented by one or more general-purpose computer systems such as a microprocessor, central processing unit, or the like. More particularly, processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 902 may also be one or more special-purpose computer systems such as an application specific integrated circuit (ASIC), a field programmable gate array (FPGA), a digital signal processor (DSP), network processor, or the like. Processor 902 is configured to execute instructions 926 for performing the operations and functions discussed herein.

Computer system 1000 may further include a network interface device 922, a video display unit 910, a character input device 912 (e.g., a keyboard), and a touch screen input device 914.

Data storage device 918 may include a computer-readable storage medium 924 on which is stored one or more sets of instructions 926 embodying any one or more of the methodologies or functions described herein. Instructions 926 may also reside, completely or at least partially, within main memory 904 and/or within processor 902 during execution thereof by computer system 1000, main memory 904 and processor 902 also constituting computer-readable storage media. Instructions 926 may further be transmitted or received over network 916 via network interface device 922.

In certain implementations, instructions 926 may include instructions of methods 200, 700 for training a text classifier and classifying natural language texts, in accordance with one or more aspects of the present disclosure. While computer-readable storage medium 924 is shown in the example of FIG. 9 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    receiving, by a computer system, a natural language text;
    processing the natural language text by an autoencoder represented by an artificial neural network comprising an input layer, a hidden layer, and an output layer;
    feeding, to a text classifier, an input vector comprising an output of the hidden layer; and
    determining, using the text classifier, a degree of association of the natural language text with a certain text category.

2. The method of claim 1, wherein the hidden layer comprises an activation function provided by a rectified linear unit.

3. The method of claim 1, wherein a first dimension of the input layer is equal to a second dimension of the output layer and is greater than a third dimension of the hidden layer.

4. The method of claim 1, further comprising:
    producing a feature vector comprising a plurality of term frequency-inverse document frequency (TF-IDF) values, each value reflecting a frequency of occurrence, in the natural language text, of a word identified by an index of the value in the feature vector; and
    producing the input vector by concatenating the output of the hidden layer and the feature vector.

5. The method of claim 1, further comprising:
    producing a plurality of classifier input vectors, wherein each classifier input vector comprises an output of the hidden layer; and
    training the text classifier using the plurality of classifier input vectors, wherein each classifier input vector is associated with a known category of a training natural language text that has been utilized for producing the output of the hidden layer.

6. The method of claim 1, further comprising:
    producing a plurality of classifier input vectors, wherein each classifier input vector comprises a combination of a feature vector representing a natural language text and an output of the hidden layer produced by processing the natural language text; and
    training the text classifier using the plurality of classifier input vectors, wherein each classifier input vector is associated with a known category of a training natural language text that has been utilized for producing the output of the hidden layer.

7. The method of claim 1, further comprising:
    producing a plurality of feature vectors, wherein each feature vector represents a training natural language text of a text corpus, wherein the text corpus comprises a first plurality of annotated natural language texts and a second plurality of un-annotated natural language texts;
    training the autoencoder using the plurality of feature vectors.

8. The method of claim 1, further comprising:
    performing, based on the degree of association, a natural language processing task.

9. A system, comprising:
    a memory;
    a processor, coupled to the memory, the processor configured to:
        receive a natural language text;
        process the natural language text by an autoencoder represented by an artificial neural network comprising an input layer, a hidden layer, and an output layer;
        feed, to a text classifier, an input vector comprising an output of the hidden layer; and
        determine, using the text classifier, a degree of association of the natural language text with a certain text category.

10. The system of claim 9, wherein the hidden layer comprises an activation function provided by a rectified linear unit.

11. The system of claim 9, wherein a first dimension of the input layer is equal to a second dimension of the output layer and is greater than a third dimension of the hidden layer.

12. The system of claim 9, wherein the processor is further configured to:
    produce a feature vector comprising a plurality of term frequency-inverse document frequency (TF-IDF) values, each value reflecting a frequency of occurrence, in the natural language text, of a word identified by an index of the value in the feature vector; and
    producing the input vector by concatenating the output of the hidden layer and the feature vector.

13. The system of claim 9, wherein the processor is further configured to:
    produce a plurality of classifier input vectors, wherein each classifier input vector comprises an output of the hidden layer; and
    train the text classifier using the plurality of classifier input vectors, wherein each classifier input vector is associated with a known category of a training natural language text that has been utilized for producing the output of the hidden layer.

14. The system of claim 9, wherein the processor is further configured to:
 produce a plurality of classifier input vectors, wherein each classifier input vector comprises a combination of a feature vector representing a natural language text and an output of the hidden layer produced by processing the natural language text; and
 training the text classifier using the plurality of classifier input vectors, wherein each classifier input vector is associated with a known category of a training natural language text that has been utilized for producing the output of the hidden layer.

15. The system of claim 9, wherein the processor is further configured to:
 produce a plurality of feature vectors, wherein each feature vector represents a training natural language text of a text corpus, wherein the text corpus comprises a first plurality of annotated natural language texts and a second plurality of un-annotated natural language texts;
 training the autoencoder using the plurality of feature vectors.

16. The system of claim 9, wherein the processor is further configured to:
 perform, based on the degree of association, a natural language processing task.

17. A non-transitory computer-readable storage medium comprising executable instructions that, when executed by a computer system, cause the computer system to:
 receive a natural language text;
 process the natural language text by an autoencoder represented by an artificial neural network comprising an input layer, a hidden layer, and an output layer;
 feed, to a text classifier, an input vector comprising an output of the hidden layer; and
 determine, using the text classifier, a degree of association of the natural language text with a certain text category.

18. The non-transitory computer-readable storage medium of claim 17, further comprising executable instructions that, when executed by the computer system, cause the computer system to:
 perform, based on the degree of association, a natural language processing task.

19. The non-transitory computer-readable storage medium of claim 17, wherein a first dimension of the input layer is equal to a second dimension of the output layer and is greater than a third dimension of the hidden layer.

20. The non-transitory computer-readable storage medium of claim 17, further comprising executable instructions that, when executed by the computer system, cause the computer system to:
 produce a feature vector comprising a plurality of term frequency-inverse document frequency (TF-IDF) values, each value reflecting a frequency of occurrence, in the natural language text, of a word identified by an index of the value in the feature vector; and
 producing the input vector by concatenating the output of the hidden layer and the feature vector.

* * * * *